(12) United States Patent
Hasegawa et al.

(10) Patent No.: US 6,918,128 B2
(45) Date of Patent: Jul. 12, 2005

(54) PLAYBACK APPARATUS WITH STRUCTURE FOR PREVENTING WRONG-INSERTION OF RECORDING MEDIUM

(75) Inventors: Hiroshi Hasegawa, Tokyo (JP); Koki Tamai, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 403 days.

(21) Appl. No.: 10/185,571

(22) Filed: Jun. 28, 2002

(65) Prior Publication Data

US 2003/0002422 A1 Jan. 2, 2003

(30) Foreign Application Priority Data

Jun. 28, 2001 (JP) ........................................ 2001-195963

(51) Int. Cl.[7] ............................................. G11B 33/02
(52) U.S. Cl. ..................................................... 720/647
(58) Field of Search ........................... 360/99.01, 99.02, 360/97.02, 97.04, 99.06; 720/600, 646, 647, 655

(56) References Cited

U.S. PATENT DOCUMENTS 5,383,072 A * 1/1995 Lee ........................... 360/96.5
6,404,720 B1 * 6/2002 Inoue ......................... 720/647
6,618,339 B2 * 9/2003 Sugita et al. ................ 720/647

FOREIGN PATENT DOCUMENTS

| DE | 19718758 A1 | * | 11/1997 | ......... G11B/15/675 |
| JP | 04344380 A | * | 11/1992 | ........... G11B/33/02 |
| JP | 11339457 A | * | 12/1999 | ........... G11B/33/02 |
| JP | 2001135069 A | * | 5/2001 | ........... G11B/33/02 |
| JP | 2002324387 A | * | 11/2002 | ........... G11B/33/02 |

* cited by examiner

*Primary Examiner*—William J Klimowicz (57) ABSTRACT

A playback apparatus with a structure for preventing wrong-insertion of a recording medium. The apparatus includes a main unit having a loading slot for the recording medium in the front thereof and a shutter member pivotably mounted on a portion of the main unit behind the loading slot for opening and closing the loading slot. A recess is provided on the front face of a shutter blade that is visible from the loading slot, for guiding the recording medium in the closing direction of the shutter member by a load applied when the recording medium is inserted from the loading slot while the loading slot is closed by the shutter member. The apparatus can prevent an unintentional pivotal movement of the shutter member due to the load applied when the recording medium is inserted while the loading slot is closed by the shutter member.

12 Claims, 9 Drawing Sheets

PLAYBACK APPARATUS WITH STRUCTURE FOR PREVENTING WRONG-INSERTION OF RECORDING MEDIUM

BACKGROUND OF THE INVENTION

1. Field of the Invention

The present invention relates to a playback apparatus with a structure for preventing wrong-insertion of a recording medium such as a CD-ROM.

2. Description of the Related Art

Hitherto, apparatuses that play back a recording medium such as a CD-ROM are widely known as in-vehicle audio equipment (playback apparatuses).

Figure 7:
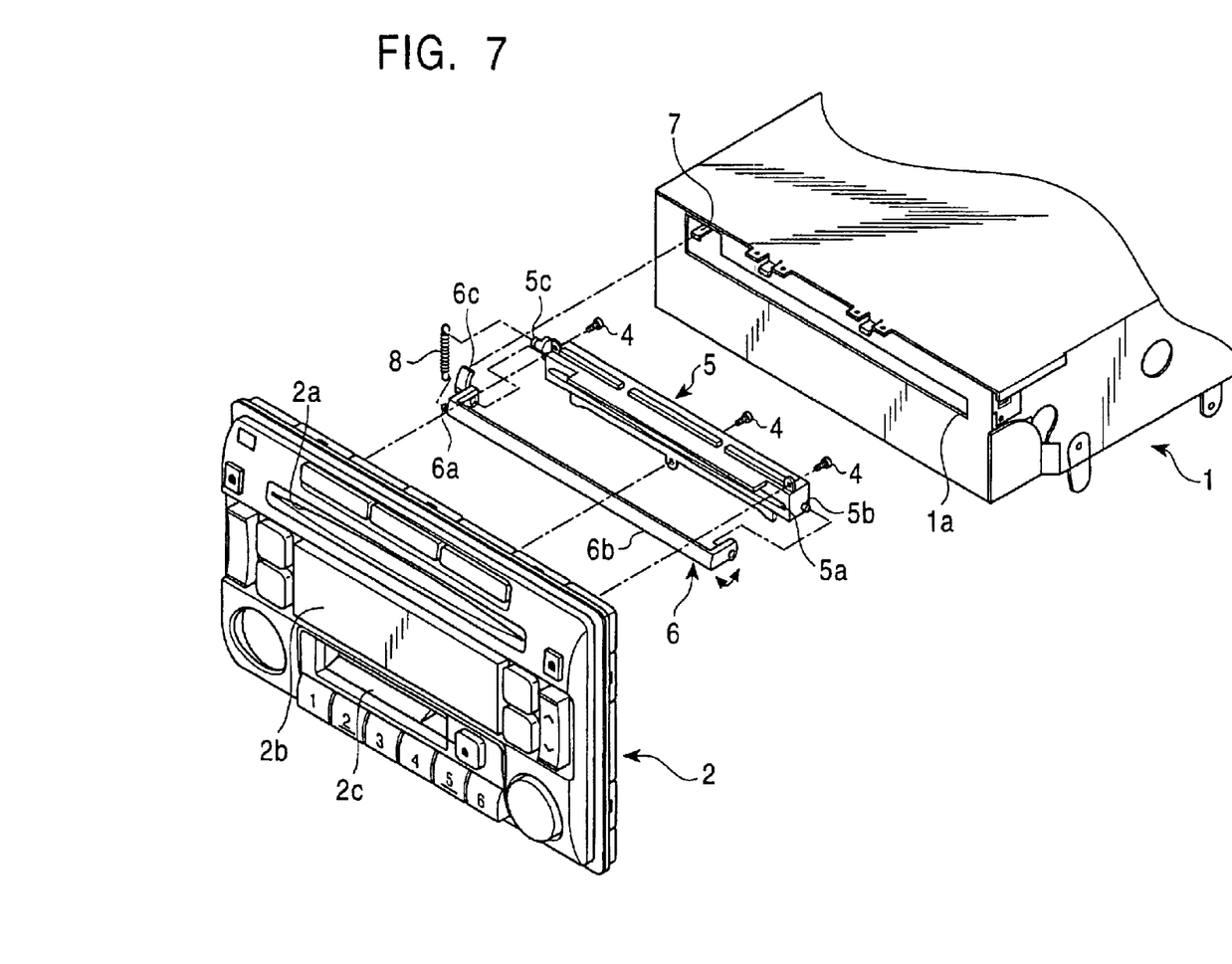
FIG. 7 is an exploded perspective external view of a CD changer with a conventional structure for preventing wrong-insertion of a recording medium.

Such audio equipment has, as shown in FIG. 7, a playback apparatus 3 including a playback device 1, serving as a casing, and a control panel 2. A shutter base 5 is fixed using screws 4 to the rear side of the control panel 2. A shutter member 6 is pivotably mounted on the shutter base 5.

The playback device 1, which can receive a plurality of CD-ROMs, encases a CD-ROM receiving mechanism, a selector for selecting a designated CD-ROM, a pickup device for playing back the selected CD-ROM, and associated parts (none of which are shown). Also, the playback device 1 has an opening 1a into which the CD-ROM is inserted and a lever 7 for pivoting the shutter member 6 with its forward movement, the tip of the lever 7 projecting from the opening 1a.

The control panel 2 is attached to the playback device 1 and various selectable switches are provided on the front face of the control panel 2. The control panel 2 also has a display 2b, a cassette tape loading slot 2c, and so on, as well as a CD-ROM loading slot 2a, which is aligned with the opening 1a.

The shutter base 5 has a passage 5a for the CD-ROM to pass through between the loading slot 2a and the opening 1a, and a shaft 5b (only one end is shown) for pivotably supporting the shutter member 6. A pin 5c for retaining one end of a spring 8 protrudes from the shutter base 5.

The shutter member 6 has a pin 6a for retaining the other end of the spring 8, a shutter blade 6b for blocking the spatial communication between the loading slot 2a and the passage 5a with the elastic force of the spring 8, and an arm 6c, which is contactable with the tip of the lever 7. When the lever 7 moves toward the front of the playback apparatus 3 and the tip of the lever 7 pushes the arm 6c, the arm 6c causes the shutter blade 6b to pivot.

In such a configuration described above, for example, when the CD-ROM is played back or when the mechanism for sequentially receiving a plurality of CD-ROMs is being driven, it is necessary to prevent another CD-ROM from being loaded into the playback device 1. To this end, the shutter blade 6b is moved by the elastic force of the spring 8, so as to block the spatial communication between the loading slot 2a and the passage 5a.

When loading of a CD-ROM is permitted, the lever 7 moves toward the front of the playback apparatus 3 and pushes the arm 6c in order to pivot the shutter member 6 to overcome the elastic force of the spring 8, thus again allowing the spatial communication between the loading slot 2a and the passage 5a.

Figure 8A:
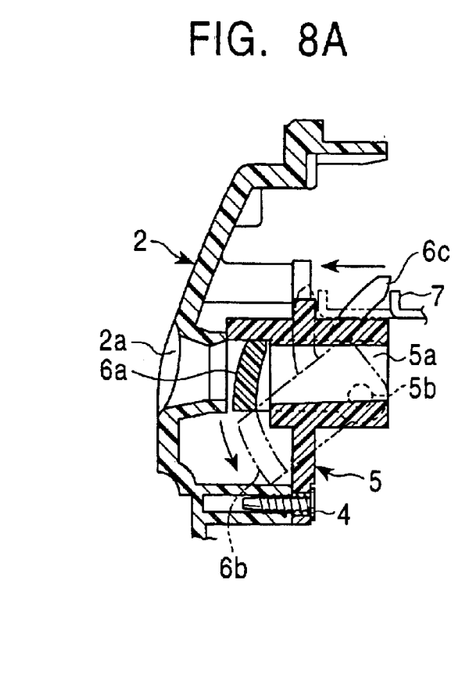
FIG. 8A is a vertical sectional view showing the main part of the CD changer with the conventional structure for preventing wrong-insertion of the recording medium.
Figure 8B:
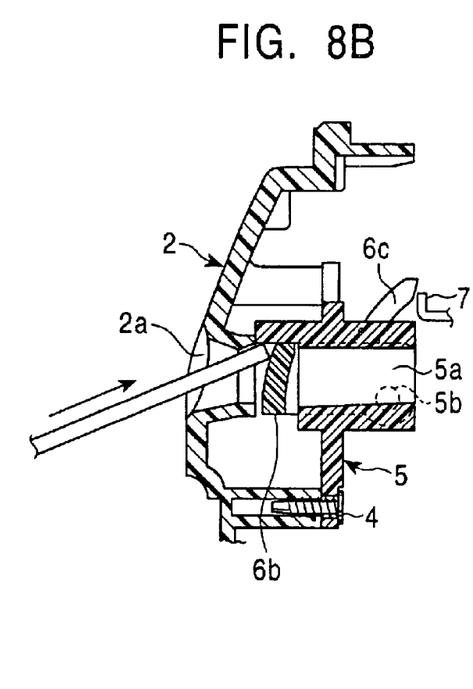
FIG. 8B is a vertical sectional view, in which the CD-ROM as the recording medium is inserted at an upward angle from a lower position.

In a playback apparatus with a structure for preventing wrong-insertion of a recording medium constructed as described above, when the CD-ROM is inserted at an upward angle from a lower position, as shown in FIG. 8B, while the shutter member 6 blocks the spatial communication between the loading slot 2a and the passage 5a, as shown in FIG. 8A, the leading edge of the CD-ROM abuts against a part around the center in the width direction of the shutter blade 6b, because the CD-ROM is a thin disc.

Figure 8C:
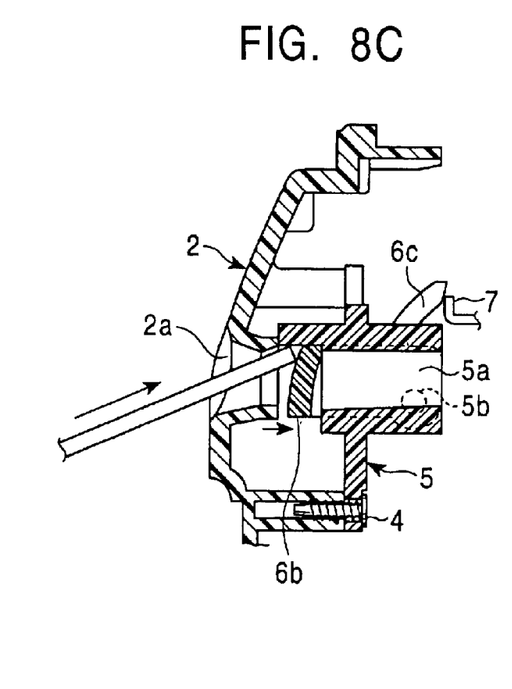
FIG. 8C is a vertical sectional view, in which the shutter blade flexes.

At this time, due to the load applied by the inserted CD-ROM and the fact the shutter blade 6b is wide, as shown in FIG. 8C, flexing of the shutter blade 6b may occur as a result, so that the central part thereof is displaced toward the passage 5a. Any additional load may cause the CD-ROM to enter into the space between the uppermost edge of the shutter blade 6b and the shutter base 5, resulting in the shutter blade 6b unintentionally pivoting. Accordingly, there is the possibility that the CD-ROM may be accidentally inserted into the playback apparatus.

Figure 9A:
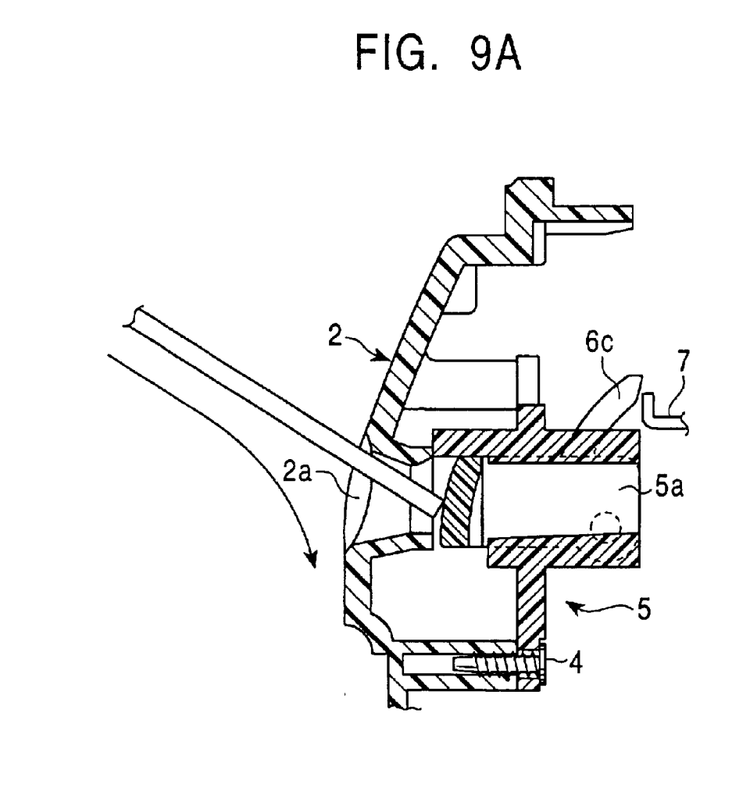
FIG. 9A is a vertical sectional view showing the main part of the CD changer with the conventional structure for preventing wrong-insertion of the recording medium, in which the CD-ROM as the recording medium is inserted at a downward angle from an upper position.
Figure 9B:
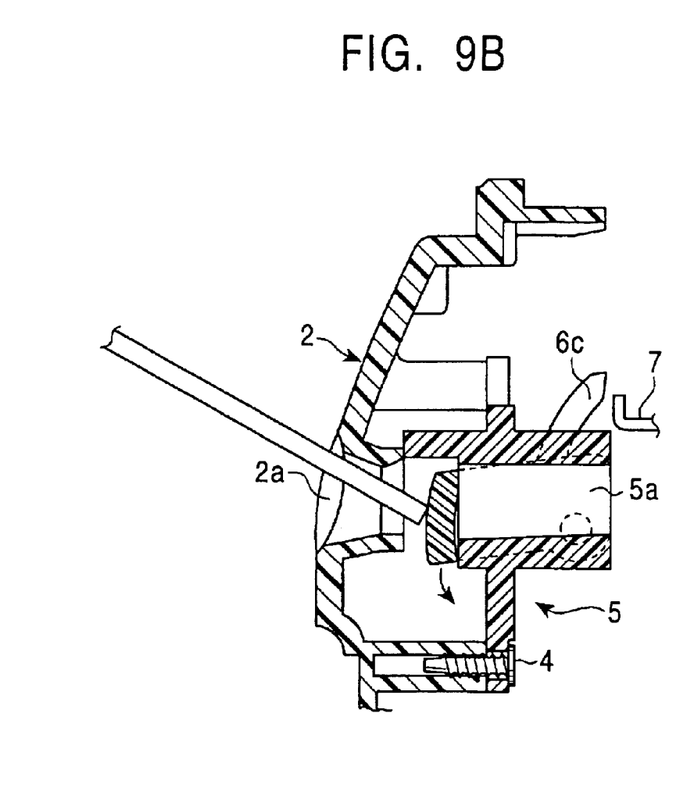
FIG. 9B is a vertical sectional view, in which the shutter blade flexes.

When the CD-ROM is inserted at a downward angle from an upper position while the shutter member 6 blocks the spatial communication between the loading slot 2a and the passage 5a, as shown in FIG. 9A, there is the possibility that the load applied by the inserted CD-ROM may cause the shutter blade 6b to unintentionally pivot, as shown in FIG. 9B.

SUMMARY OF THE INVENTION

Accordingly, in order to solve the problems described above, it is an object of the present invention to provide a playback apparatus with a structure for preventing wrong-insertion of a recording medium, which apparatus can prevent an unintentional pivotal movement of the shutter member due to the load applied when the recording medium is inserted while the loading slot is closed by the shutter member.

In order to achieve the above-mentioned object, according to a first aspect of the present invention, there is provided a playback apparatus with a structure for preventing wrong-insertion of a recording medium. The apparatus includes a main unit having a loading slot for the recording medium in the front thereof and a shutter member pivotably mounted on a portion of the main unit behind the loading slot for opening and closing the loading slot. The shutter member includes a shutter blade. A recess is provided on the front face of the shutter blade that can be seen from the loading slot, for guiding the recording medium in the closing direction of the shutter member by a load applied to the recording medium when the recording medium is inserted from the loading slot while the loading slot is closed by the shutter member. Such an apparatus can prevent an unintentional pivotal movement of the shutter member due to the load applied when the recording medium is inserted while the loading slot is closed by the shutter member, particularly an unintentional pivotal movement of the shutter member when the recording medium is inserted at an upward angle from a lower position.

According to a second aspect of the present invention, a playback apparatus with a structure for preventing wrong-insertion of a recording medium is provided. The apparatus includes a main unit having a loading slot for the recording medium in the front thereof and a shutter member pivotably mounted on a portion of the main unit behind the loading slot for opening and closing the loading slot. The shutter member includes a shutter blade. A shoulder is formed on a portion of the main unit at a position behind the shutter blade, which shoulder normally allows the shutter member to pivot and engages with a portion of the shutter member that is flexed by a load applied to the recording medium when the recording medium is inserted from the loading slot while the loading slot is closed by the shutter member. Such an apparatus can prevent an unintentional pivotal movement of the shutter member due to the load applied when the recording medium is inserted while the loading slot is closed by the shutter member.

According to a third aspect of the present invention, a playback apparatus with a structure for preventing wrong-insertion of a recording medium is provided. The apparatus includes a main unit having a loading slot for the recording medium in the front thereof and a shutter member pivotably mounted on a portion of the main unit behind the loading slot for opening and closing the loading slot. The shutter member includes a shutter blade. A protrusion is formed on a portion of the main unit at a position behind the shutter blade, which protrusion normally allows the shutter member to pivot and engages with a portion of the shutter member that is flexed by a load applied to the recording medium when the recording medium is inserted from the loading slot, while the loading slot is closed by the shutter member, to restrict a pivotal movement of the shutter member in the opening direction thereof. Such an apparatus can prevent an unintentional pivotal movement of the shutter member due to the load applied when the recording medium is inserted while the loading slot is closed by the shutter member, particularly an unintentional pivotal movement of the shutter member when the recording medium is inserted at a downward angle from an upper position.

According to any combination of the preceding aspects of the present invention, a playback apparatus with a structure for preventing wrong-insertion of a recording medium is provided. Such an apparatus can prevent an unintentional pivotal movement of the shutter member due to the load applied when the recording medium is inserted while the loading slot is closed by the shutter member, particularly an unintentional pivotal movement of the shutter member when the recording medium is inserted at an upward or downward angle from a lower or upper position.

The above and other objects, features, and advantages of the present invention will become clear from the following description of the preferred embodiment taken in conjunction with the accompanying drawings.

DESCRIPTION OF THE PREFERRED EMBODIMENTS

An embodiment of a playback apparatus with a structure for preventing wrong-insertion of a recording medium of the present invention, which is applied to an in-vehicle CD autochanger, will be described with reference to the accompanying drawings. A general view of the CD autochanger is omitted here.

Figure 1:
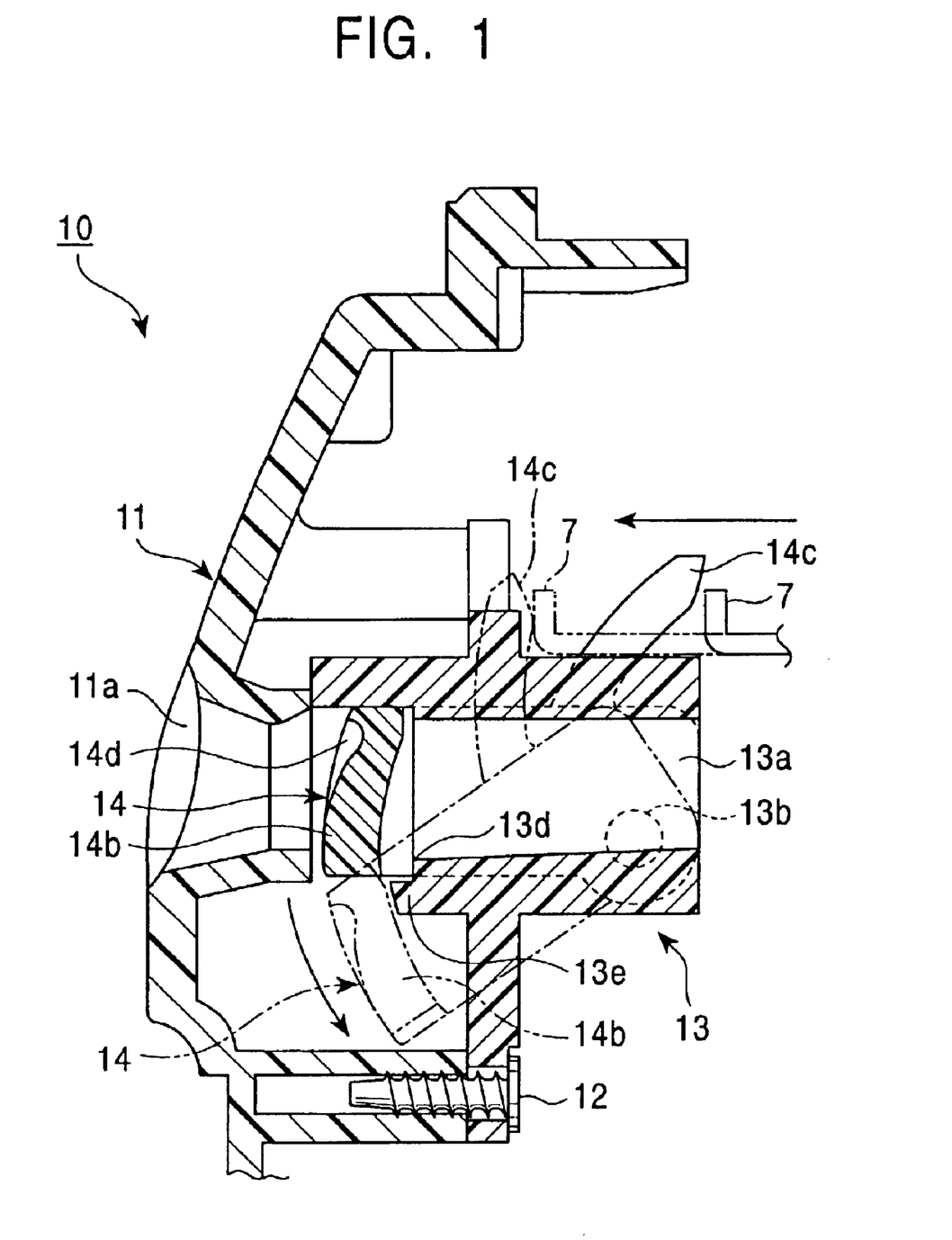
FIG. 1 is an enlarged vertical sectional view showing the main part of a playback apparatus according to an embodiment of the present invention with a structure for preventing wrong-insertion of a recording medium.
Figure 2A:
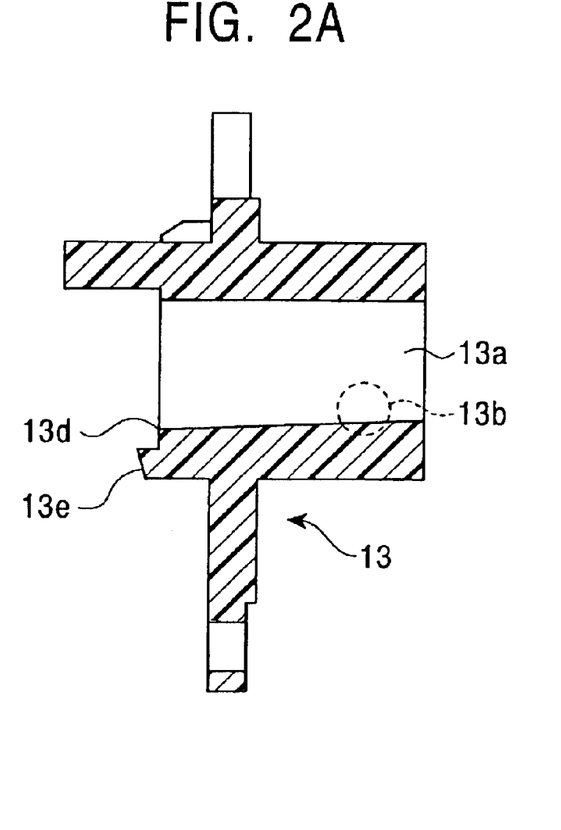
FIG. 2A is an enlarged vertical sectional view showing a shutter base thereof.
Figure 2B:
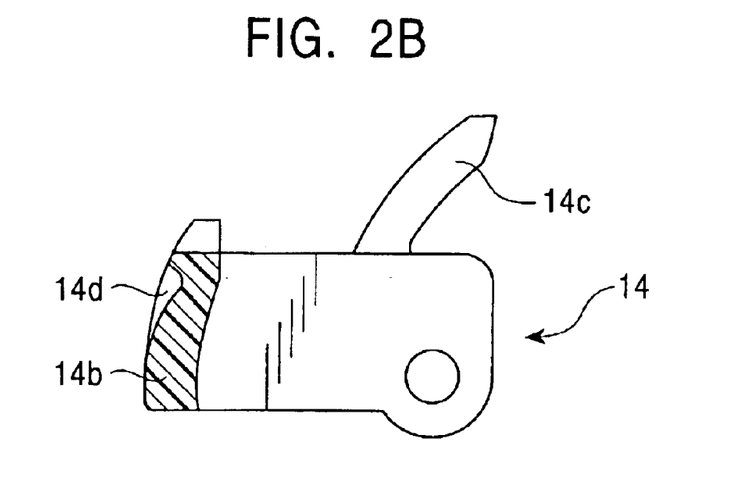
FIG. 2B is an enlarged vertical sectional view showing a shutter member thereof.
Figure 3A:
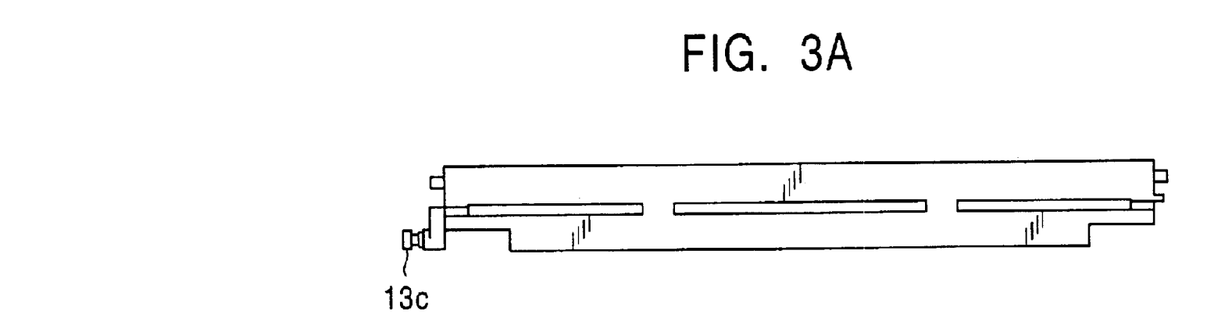
FIG. 3A is a plan view showing the shutter base.
Figure 3B:
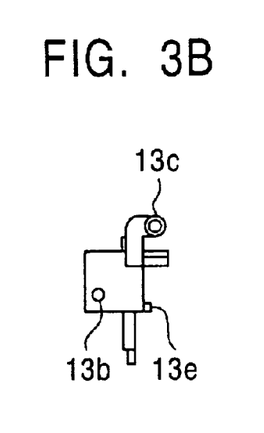
FIG. 3B is a left-side view showing the shutter base.
Figure 3C:
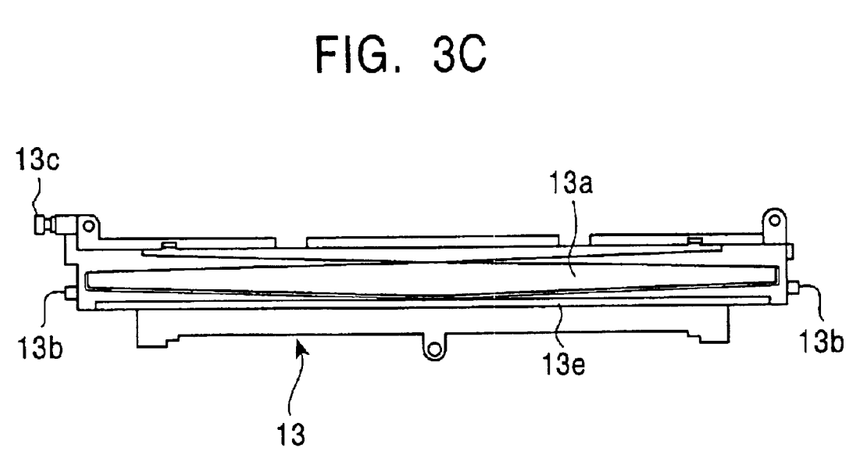
FIG. 3C is a front view showing the shutter base.
Figure 3D:
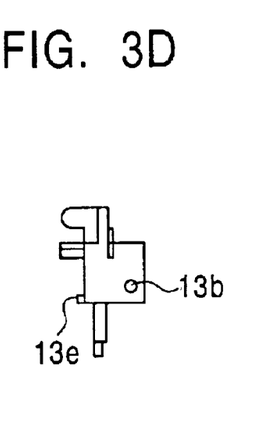
FIG. 3D is a right-side view showing the shutter base.
Figure 4A:
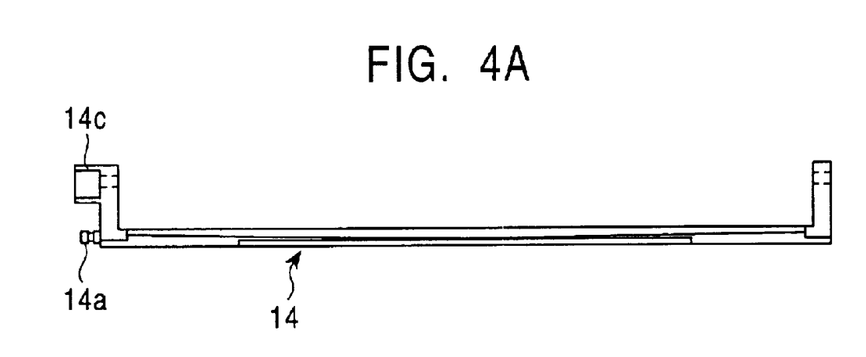
FIG. 4A is a plan view showing the shutter member.
Figures 4B, 4C:
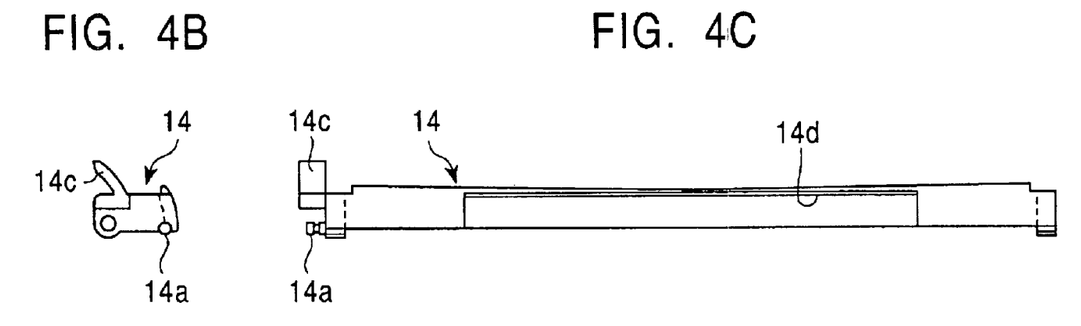
FIG. 4B is a left-side view showing the shutter member.
FIG. 4C is a front view showing the shutter member.
Figure 4D:
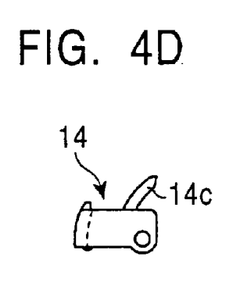
FIG. 4D is a right-side view showing the shutter member.

Referring to FIG. 1, the playback apparatus according to the present invention has a main unit, which includes the CD autochanger 10. The CD autochanger has a control panel 11, a shutter base 13 fixed on the inner side of the control panel 11 by means of screws 12, and a shutter member 14 rotatably mounted on the shutter base 13.

The control panel 11 is attached to a playback device (not shown), which is part of the main unit. Various selectable switches are provided on the front face of the control panel 11. The control panel 11 also has a display, a cassette tape loading slot, and so on (none of which are shown), as well as a CD-ROM loading slot 11a, which is aligned with an opening of the playback device.

The shutter base 13 has, as shown in FIGS. 2A and 3A to 3D, a passage 13a for the CD-ROM to pass through between the loading slot 11a and the opening of the playback device, a shaft 13b for pivotably supporting the shutter member 14, and a pin 13c for supporting one end of a spring (not shown). The end of the shutter base 13 defining the inlet end of the passage 13a is partly stepped to provide a shoulder 13d and a protrusion 13e.

The shoulder 13d is formed at least on the lower part of the end edge at the side where the CD-ROM is inserted into the shutter base 13. The protrusion 13e is positioned below the shoulder 13d.

The shutter member 14 has, as shown in FIGS. 2B and 4A to 4D, a pin 14a for supporting the other end of the spring, a shutter blade 14b for blocking the spatial communication between the loading slot 11a and the passage 13a with the elastic force of the spring, and an arm 14c, which is contactable with the tip of a lever 7 for causing the shutter blade 14b to open and close.

Further, a recess 14d having a predetermined width centering around the widthwise midpoint of the shutter blade 14b, which is positioned in the upper part of the shutter blade 14b, is formed on the front face of the shutter blade 14b.

In such a configuration, for example, when the CD-ROM is played back or when the mechanism for sequentially receiving a plurality of CD-ROMs is being driven, it is necessary to prevent another CD-ROM from being loaded into the playback device. To this end, the shutter blade 14b is moved by the elastic force of the spring, so as to block the spatial communication between the loading slot 11a and the passage 13a.

When loading of a CD-ROM is permitted, the lever 7 moves toward the front of the CD autochanger indicated by the left arrow in FIG. 1 and pushes the arm 14c in order to pivot the shutter member 14 to overcome the elastic force of the spring, thus again allowing the spatial communication between the loading slot 11a and the passage 13a.

Figure 5A:
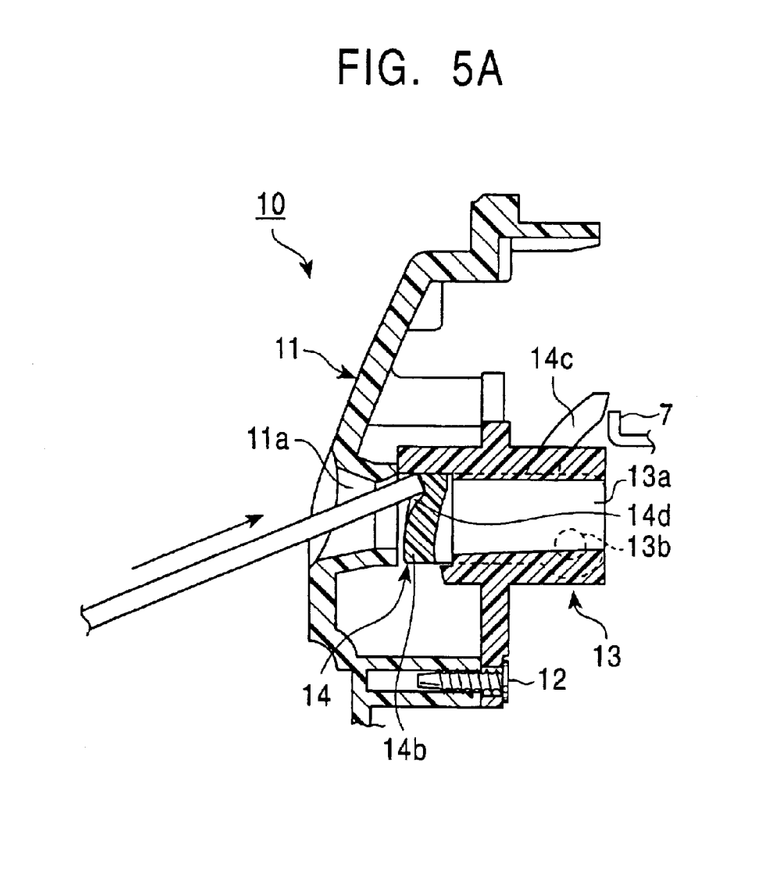
FIG. 5A is a vertical sectional view, in which a CD-ROM as the recording medium is inserted at an upward angle from a lower position.

On one hand, as shown in FIG. 5A, when the CD-ROM is inserted at an upward angle from a lower position while the shutter member 14 blocks the spatial communication between the loading slot 11a and the passage 13a, the leading edge of the CD-ROM slides into the recess 14d on the shutter blade 14b owing to the surface configuration of the shutter blade 14b.

Figure 5B:
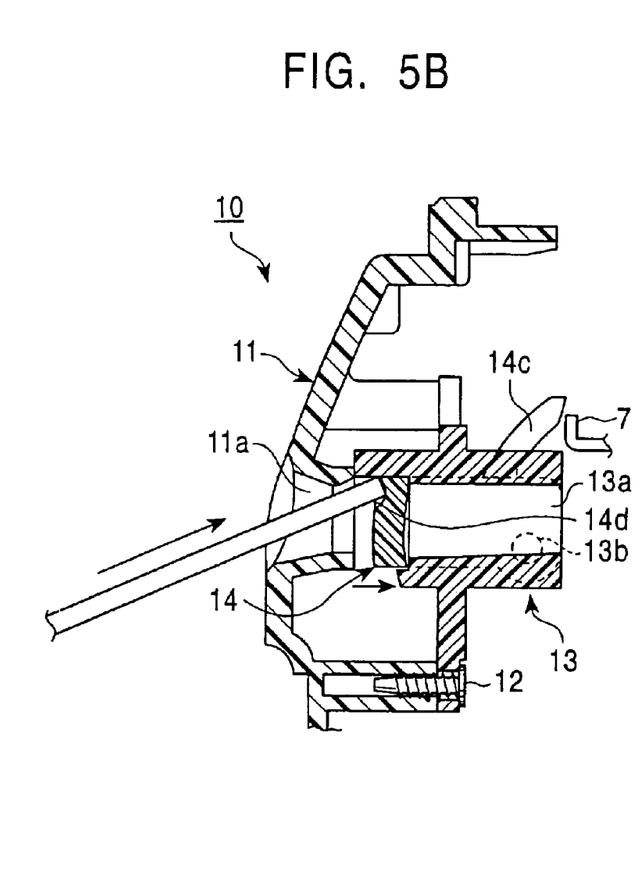
FIG. 5B is a vertical sectional view, in which a pivotal movement of the shutter member is restricted.

When the CD-ROM is further inserted into the CD autochanger in such a condition, as shown in FIG. 5B, the shutter blade 14b abuts against the upper portion of the passage 13a while flexing due to the load applied by the inserted CD-ROM, so that the flexure of the shutter blade 14b is restricted. This prevents the CD-ROM from being further inserted or from sliding into the space between the shutter blade 14b and the shutter base 13. The shoulder 13d may be formed all around the edge of the passage 13a to further ensure restriction of the deformation of the shutter blade 14b when flexed.

Figure 6A:
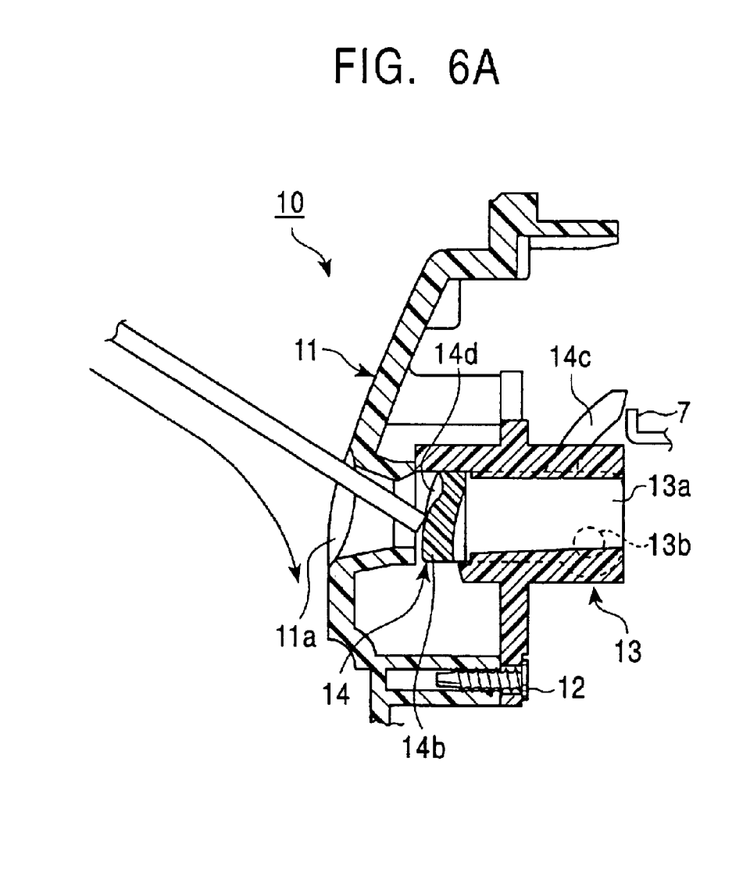
FIG. 6A is a vertical sectional view, in which the CD-ROM as the recording medium is inserted at a downward angle from an upper position.
Figure 6B:
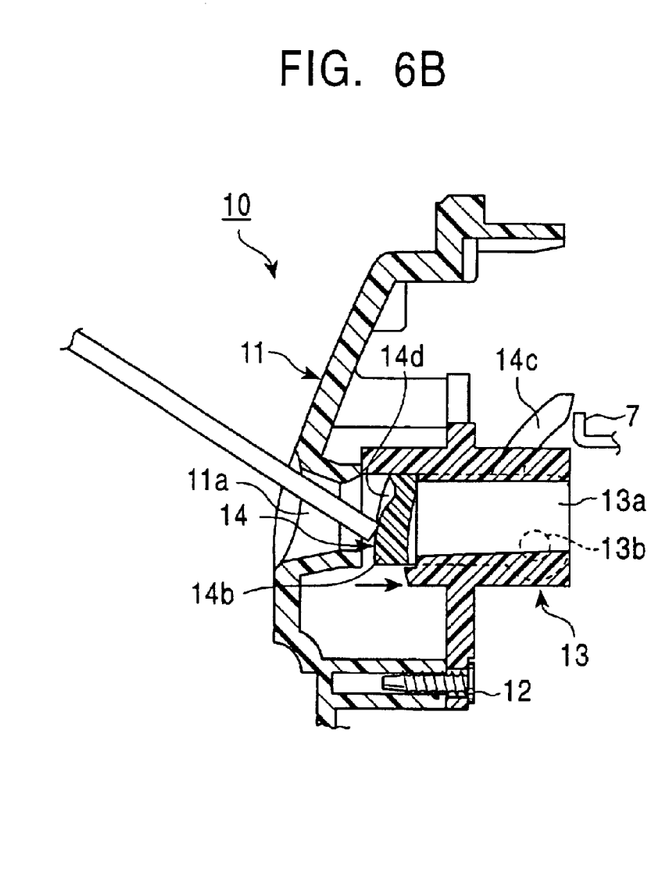
FIG. 6B is a vertical sectional view, in which a pivotal movement of the shutter member is restricted.

On the other hand, when the CD-ROM is inserted at a downward angle from an upper position while the shutter member 14 blocks the spatial communication between the loading slot 11a and the passage 13a, as shown in FIG. 6A, the shutter blade 14b abuts against the shoulder 13d while flexing due to the load applied by the inserted CD-ROM, as shown in FIG. 6B. In such a condition, even when the shutter blade 14b attempts to pivot owing to the load applied by the inserted CD-ROM, the shutter blade 14b abuts against the protrusion 13e, thus preventing an unintentional pivotal movement.

While a preferred embodiment of the invention has been described using specific terms, this description is for illustrative purposes only, and it is to be understood that changes and variations may be made without departing from the spirit or scope of the following claims.

What is claimed is:

1. A playback apparatus with a structure for preventing wrong-insertion of a recording medium, comprising:
   a main unit having a loading slot for the recording medium in the front thereof; and
   a shutter member pivotably mounted on a portion of said main unit behind said loading slot, for opening and closing said loading slot, said shutter member including a shutter blade,
   wherein a recess is provided on the front face of said shutter blade that can be seen from said loading slot, said recess guiding the recording medium in the closing direction of said shutter member by a load applied to the recording medium when the recording medium is inserted from said loading slot while said loading slot is closed by said shutter member.

2. A playback apparatus with a structure for preventing wrong-insertion of a recording medium, comprising:
   a main unit having a loading slot for the recording medium in the front thereof; and
   a shutter member pivotably mounted on a portion of said main unit behind said loading slot, for opening and closing said loading slot, said shutter member including a shutter blade,
   wherein a shoulder is formed on a portion of said main unit at a position behind said shutter blade, which shoulder normally allows said shutter member to pivot and engages with a portion of said shutter member that is flexed by a load applied to the recording medium when the recording medium is inserted from said loading slot while said loading slot is closed by said shutter member.

3. A playback apparatus with a structure for preventing wrong-insertion of a recording medium, comprising:
   a main unit having a loading slot for the recording medium in the front thereof; and
   a shutter member pivotably mounted on a portion of said main unit behind said loading slot, for opening and closing said loading slot, said shutter member including a shutter blade,
   wherein a protrusion is formed on a portion of said main unit at a position behind said shutter blade, which protrusion normally allows said shutter member to pivot and engages with a portion of said shutter member that is flexed by a load applied to the recording medium when the recording medium is inserted from said loading slot, while said loading slot is closed by said shutter member, to restrict a pivotal movement of said shutter member in the opening direction thereof.

4. A playback apparatus with a structure for preventing wrong-insertion of a recording medium, comprising:
   a main unit having a loading slot for the recording medium in the front thereof; and
   a shutter member pivotably mounted on a portion of said main unit behind said loading slot, for opening and closing said loading slot, said shutter member including a shutter blade,
   wherein a recess is provided on the front face of said shutter blade that can be seen from said loading slot, said recess guiding the recording medium in the closing direction of said shutter member by a load applied to the recording medium when the recording medium is inserted from said loading slot while said loading slot is closed by said shutter member; and a shoulder is formed on a portion of said main unit at a position behind said shutter blade, which shoulder normally allows said shutter member to pivot and engages with a portion of said shutter member that is flexed by the load applied to the recording medium when the recording medium is inserted from said loading slot while said loading slot is closed by said shutter member.

5. A playback apparatus with a structure for preventing wrong-insertion of a recording medium, comprising:
   a main unit having a loading slot for the recording medium in the front thereof; and
   a shutter member pivotably mounted on a portion of said main unit behind said loading slot, for opening and closing said loading slot, said shutter member including a shutter blade,
   wherein a recess is provided on the front face of said shutter blade that can be seen from said loading slot, said recess guiding the recording medium in the closing direction of said shutter member by a load applied to the recording medium when the recording medium is inserted from said loading slot while said loading slot is closed by said shutter member; and a protrusion is formed on a portion of said main unit at a position behind said shutter blade, which protrusion normally allows said shutter member to pivot and engages with a portion of said shutter member that is flexed by the load applied to the recording medium when the recording medium is inserted from said loading slot, while said loading slot is closed by said shutter member, to restrict a pivotal movement of said shutter member in the opening direction thereof.

6. A playback apparatus with a structure for preventing wrong-insertion of a recording medium, comprising:

a main unit having a loading slot for the recording medium in the front thereof; and a shutter member pivotably mounted on a portion of said main unit behind said loading slot, for opening and closing said loading slot, said shutter member including a shutter blade, wherein a shoulder is formed on a portion of said main unit at a position behind said shutter blade, which shoulder normally allows said shutter member to pivot and engages with a portion of said shutter member that is flexed by a load applied to the recording medium when the recording medium is inserted from said loading slot while said loading slot is closed by said shutter member; and a protrusion is formed on a portion of said main unit at a position behind said shutter blade, which protrusion normally allows said shutter member to pivot and engages with a portion of said shutter member that is flexed by the load applied to the recording medium when the recording medium is inserted from said loading slot, while said loading slot is closed by said shutter member, to restrict a pivotal movement of said shutter member in the opening direction thereof.

7. A playback apparatus with a structure for preventing wrong-insertion of a recording medium, comprising:

a main unit having a loading slot for the recording medium in the front thereof; and a shutter member pivotably mounted on a portion of said main unit behind said loading slot, for opening and closing said loading slot, said shutter member including a shutter blade, wherein a recess is provided on the front face of said shutter blade that can be seen from said loading slot, said recess guiding the recording medium in the closing direction of said shutter member by a load applied to the recording medium when the recording medium is inserted from said loading slot while said loading slot is closed by said shutter member; a shoulder is formed on a portion of said main unit at a position behind said shutter blade, which shoulder normally allows said shutter member to pivot and engages with a portion of said shutter member that is flexed by the load applied to the recording medium when the recording medium is inserted from said loading slot while said loading slot is closed by said shutter member; and a protrusion is formed on a portion of said main unit at a position behind said shutter blade, which protrusion normally allows said shutter member to pivot and engages with a portion of said shutter member that is flexed by the load applied to the recording medium when the recording medium is inserted from said loading slot, while said loading slot is closed by said shutter member, to restrict a pivotal movement of said shutter member in the opening direction thereof.

8. In a playback apparatus for receiving a recording medium through a loading slot, the improvement comprising:

a support member having a loading slot for passing a recording medium; and a flexible elongated shutter member movably mounted to be operatively positioned to permit access to the loading slot and to block the loading slot, the shutter member is positioned a predetermined distance from the support member to provide a gap when positioned for blocking the loading slot and the degree of flexure of the shutter member permits the gap to be closed when a force is exerted against the shutter member, while maintaining the integrity of the shutter member from damage to enable the support member to provide support to the shutter member.

9. The playback apparatus of claim 8 further including a support shoulder extending outward from the support member at a position below the gap when the shutter member is positioned to block the loading slot, whereby the support shoulder supports a lower edge of the shutter member when the shutter member is flexed to contact the support member.

10. The playback apparatus of claim 9, wherein the shutter member has an elongated concave upper front surface portion that merges into a lower convex surface portion across at least a central portion of the shutter member.

11. The playback apparatus of claim 10, wherein the shutter member is pivotally mounted to swing across and away from the loading slot.

12. The playback apparatus of claim 8, wherein the shutter member has an elongated concave upper front surface portion that merges into a lower convex surface portion across at least a central portion of the shutter member.

* * * * *